A. W. WHITCOMB.
COMPOUND TOOL SUPPORT.
APPLICATION FILED NOV. 27, 1914.
1,169,214.
Patented Jan. 25, 1916.
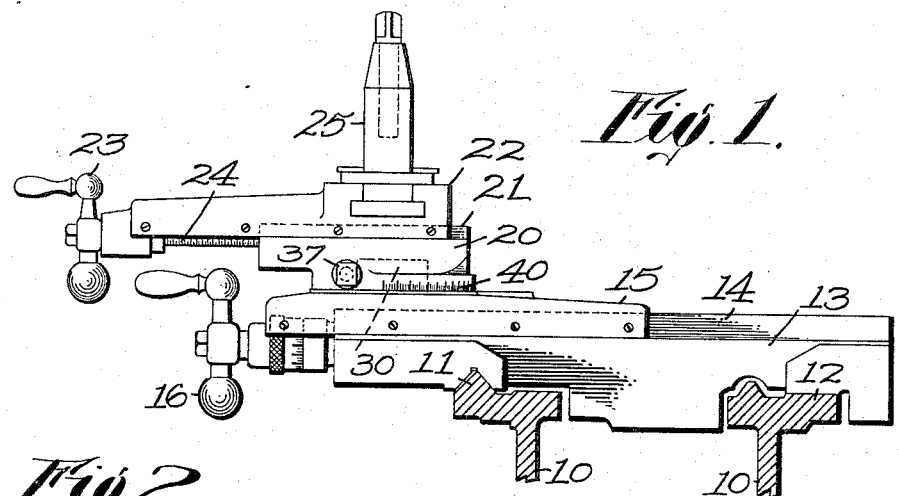
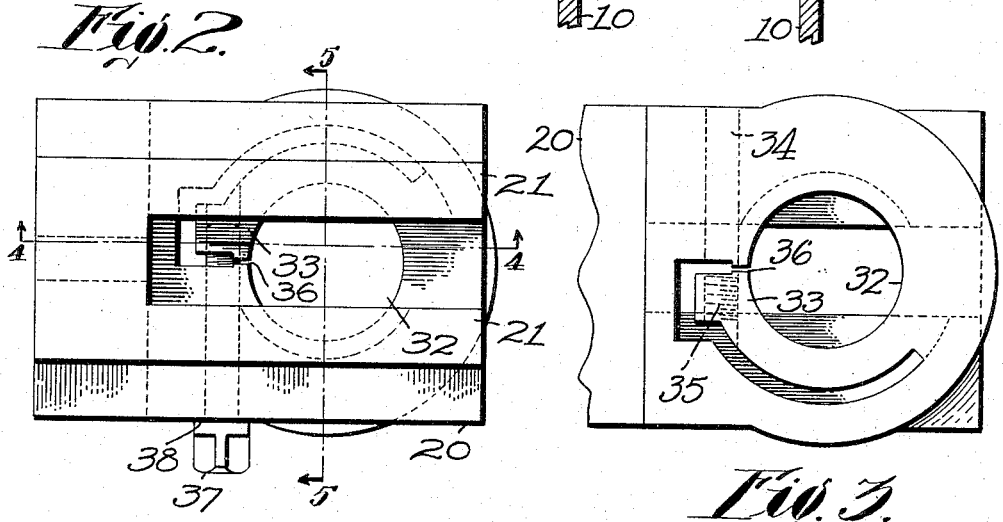
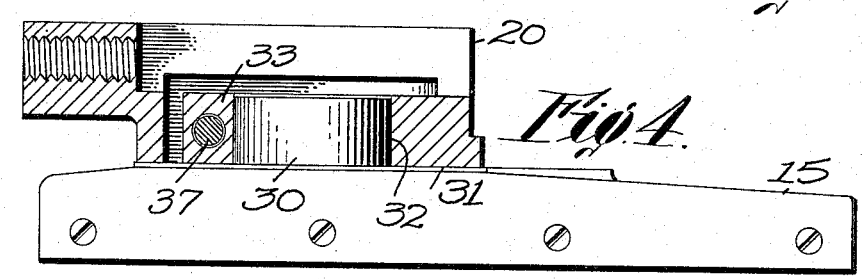
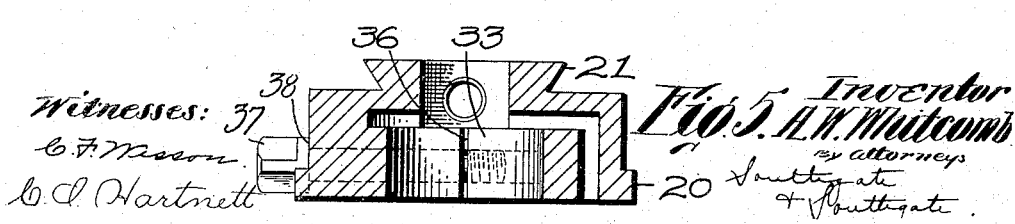

UNITED STATES PATENT OFFICE.

ALONZO W. WHITCOMB, OF WORCESTER, MASSACHUSETTS.

COMPOUND TOOL-SUPPORT.

1,169,214.  Specification of Letters Patent.  Patented Jan. 25, 1916.

Application filed November 27, 1914. Serial No. 874,157.

*To all whom it may concern:*

Be it known that I, ALONZO W. WHITCOMB, a citizen of the United States, residing at Worcester, in the county of Worcester and State of Massachusetts, have invented a new and useful Compound Tool-Support, of which the following is a specification.

This invention relates to a compound tool support, and particularly to improved devices for holding the parts of such a support in adjusted angular position.

The object of the present invention is to improve the construction of devices of the character described and to increase their efficiency with simplicity of parts and cheapness of manufacture.

The features of the invention relate to certain devices, arrangements and combinations of parts which will be hereinafter described and more particularly pointed out in the appended claims, these features possessing advantages in simplicity of construction and ease of operation, which will be clearly understood by those skilled in the art.

A preferred form of my invention is shown in the drawing, in which,

Figure 1 is a side elevation of a tool support embodying my invention; Fig. 2 is a top plan view of the swivel block; Fig. 3 is a partial bottom view of the swivel block; Fig. 4 is a side elevation with the swivel block shown in section along the line 4—4 in Fig. 2, and Fig. 5 is a transverse sectional view of the swivel block taken along the line 5—5 in Fig. 2.

I have shown my improved construction embodied in a compound tool support which in its main features is of the usual type. At 10 I have indicated the frame-work of a lathe or other machine tool having ways 11 and 12 supporting a longitudinally movable carriage 13 of any usual type. Suitable means (not shown) are provided for moving the carriage 13 longitudinally upon the ways.

Upon its upper surface the carriage is provided with guiding surfaces 14 upon which is mounted the compound base 15. A hand wheel 16 mounted upon a threaded shaft extending transversely of the carriage constitutes the cross feed for moving the compound base on the carriage.

A swivel block 20 is mounted for angular adjustment on the compound base 15 and is provided with ways or guides 21 upon which the tool slide 22 is supported in the usual way. A hand wheel 23 constitutes means for turning a threaded shaft 24 and thus moving the tool block longitudinally with reference to the swivel block. A tool post 25 of any usual form is mounted upon the tool slide 22.

All the parts thus far described in their general features may be of any usual form, as my invention resides wholly in the improved devices for angularly securing the swivel block 20 to the compound base 15.

The base 15 is provided upon its upper surface with a vertical, cylindrical projection 30 projecting from a finished horizontal surface 31. The swivel block 20 is provided with a corresponding cylindrical recess 32 formed in its lower surface and normally fitting freely over the projection 30. One side of the cylindrical recess 32, however, is formed by the inner surface of a resilient binder 33 which, in the preferred type, is formed integrally with the swivel block and is secured thereto at one end only, as clearly shown in Fig. 3.

In the manufacture of the swivel block, both ends of the binder are cast integrally with the body of the block, but a cored recess surrounds the binder on its outer side and its upper surface so that its central portion is free from the body of the block.

The recess 32 is bored out and finished while the binder is thus connected at both ends. A hole 34 is drilled transversely through the body of the block and a threaded hole 35 is formed in the end of the binder 33 and concentric with the hole 34. A slot 36 is then cut through one end of the binder so that it is thereafter resiliently connected to the body of the block at the opposite end only. A threaded stud 37 extends through the hole 34 into the threaded hole 35 and is provided with a shoulder 38 adapted to contact with the outer surface of the swivel block. The stud thus constitutes means for drawing the binder inward to contract the recess 32.

Having fully described their construction, the operation of my improved devices will be readily apparent. The swivel block is placed upon the compound base with the recess 32 fitting the projection 30. The block is then adjusted in desired angular position, a graduated scale 40 being provided for determining the angular position. The stud 37 is then turned to draw the binder 33 against the projection 30 and by this simple operation the swivel block is rigidly secured to the compound base 15.

It will be evident that the projection 30 may equally well be formed upon the swivel block, while the recess and the spring binder are formed in the compound base and I consider that this reversal of position is within the scope of my invention.

Having thus described my invention, it will be evident that other changes and modifications can be made therein by those skilled in the art without departing from the spirit and scope thereof as set forth in the claims. Accordingly I do not wish to be limited to the details herein disclosed, but

What I do claim is:—

1. A compound tool support, comprising a base having a vertical cylindrical projection on its upper surface, an angularly adjustable tool support comprising a slide and a swivel block, said block having a cylindrical recess in its lower surface fitting said projection, and means for holding said block in adjusted angular position on said base, said block having a continuous rigid outer wall and said means comprising an arc-shaped resilient member entirely inclosed by said wall and forming an integral portion of the side of said recess and binding means extending through said rigid wall and effective to force said resilient member against said projection.

2. A compound tool support comprising a base having a vertical cylindrical projection on its upper surface, an angularly adjustable tool support comprising a slide and a swivel block, said block having a cylindrical recess in its lower surface fitting said projection, and means for holding said block in adjusted angular position on said base, said block having a continuous rigid outer wall having a recess in the lower surface of said block within said wall and supplemental to said cylindrical recess, and said means comprising an arc-shaped resilient binder forming an integral part of said block, movable within said supplemental recess and connected to said block at one end only and means extending through said continuous wall and operative upon the free end of said binder to force said binder against said projection to clamp the block to the base.

3. A compound tool support comprising a base, a swivel block mounted thereon, and clamping means for securing said members together, one of said members having a continuous rigid outer wall and having a cylindrical recess in the face which engages the other member, a portion of the side wall of said recess being rigid and continuous with said outer wall and the remaining portion of said side wall of said recess being yieldingly movable and being joined to said outer wall at one end only, the other member having a cylindrical projection fitting said cylindrical recess, and said clamping means comprising a screw extending through said outer wall and engaging the yielding end of said movable side wall portion to force the same against said cylindrical projection.

In testimony whereof I have hereunto set my hand, in the presence of two subscribing witnesses.

ALONZO W. WHITCOMB.

Witnesses:
 B. ALFRED WHEELER,
 CLARENCE F. WHITE.